United States Patent
Chiu

(10) Patent No.: US 6,973,472 B2
(45) Date of Patent: Dec. 6, 2005

(54) DATA SYNCHRONIZATION SYSTEM AND METHOD BASED ON MODIFICATION RECORDS AND COMMON FORMATTING

(75) Inventor: Shuo-Shiun Chiu, Taipei (TW)

(73) Assignee: Penbex Data Systems, Inc., Taipei (TW)

( * ) Notice: Subject to any disclaimer, the term of this patent is extended or adjusted under 35 U.S.C. 154(b) by 532 days.

(21) Appl. No.: 10/227,869

(22) Filed: Aug. 27, 2002

(65) Prior Publication Data

US 2003/0104833 A1    Jun. 5, 2003

(30) Foreign Application Priority Data

Nov. 30, 2001 (TW) .............................. 90129737 A

(51) Int. Cl.[7] ............................................. G06F 15/16
(52) U.S. Cl. .................. 709/200; 455/556.1; 455/557; 707/201
(58) Field of Search ............................. 455/556.1, 557; 709/200; 707/201

(56) References Cited

U.S. PATENT DOCUMENTS 6,021,403 A * 2/2000 Horvitz et al. ................. 706/45
6,330,626 B1 * 12/2001 Dennin et al. ................. 710/52
6,367,074 B1 * 4/2002 Bates et al. ................. 711/170
6,732,122 B2 * 5/2004 Zoltan ......................... 707/201
6,832,242 B2 * 12/2004 Keskar ........................ 709/204

* cited by examiner

Primary Examiner—Lynne H. Browne
Assistant Examiner—Anand B. Patel
(74) Attorney, Agent, or Firm—Pai Patent & Trademark Law Firm; Chao-Chang David Pai

(57) ABSTRACT

A data synchronization system includes a first memory device in a handheld electronic device, a second memory device in a desktop computer, and a synchronization program installed in the desktop computer. The handheld electronic device includes a first data block. The desktop computer includes a second data block. First and second data formats of first and second data stored in the first and second data blocks respectively include a common format section. The first and second memory devices store first and second modification records of the first and second data blocks, respectively. The synchronization program updates the first and second data blocks according to the first and second modification records and transmits only the contents of the common format section when transmitting the first or second data between the handheld electronic device and the desktop computer. A data synchronization method implemented in the system is also disclosed.

27 Claims, 6 Drawing Sheets

Address Book 1

Address Book 2

First modification record

| Object | Modification |
|---|---|
| Zhang Three | Delete ( ) |

Second modification record

| Object | Modification |
|---|---|
| Li Four | Add (Li Four, 01/01/66, (02) 2222 4444, Taipei County···, Four@li.com) |
| Wang Five | Amend (NULL, NULL, (03) 555 7777, NULL, NULL) |

FIG. 3

Address Book 1

Common format section

| Name | Identity | Telephone | e-mail |
|------|----------|-----------|--------|
| Wang Five | Colleague | (03)5559999 | Five@wang.com |

Address Book 2

Common format section

| Name | DOB | Telephone | Address | E-mail |
|------|-----|-----------|---------|--------|
| Zhang Three | 01/01/70 | (02)23339999 | Taipei County ··· | Three@zhang.com |
| Wang Five | 01/01/60 | (03)5557777 | Taoyuan County ··· | Five@wang.com |
| Li Four | 01/01/66 | (02)22224444 | Taipei County ··· | Four@li.com |

FIG. 5a

Address Book 1

Address Book 2

DATA SYNCHRONIZATION SYSTEM AND METHOD BASED ON MODIFICATION RECORDS AND COMMON FORMATTING

DESCRIPTION OF THE INVENTION

1. Field of Invention

The invention relates to a data synchronization system and method and, more particularly, to a data synchronization system and method that updates the contents stored in the devices and transmits only the common format section of the modified data according to the modification records.

2. Description of the Related Art

In relation with the advancement of information technology, handheld electronic devices are built smaller in size and lighter in weight with complete functions. A handheld electronic device may provide general functions such as a calendar, an address book, a memorandum, a calculator, a clock and games. It may also provide specific functions for real time data receiving such as being used in conjunction with a physical cable or currently the most popular wireless communication device to receive an electronic business card, web page information, or even financial exchanging information. The price for a handheld electronic device has become less expensive and hence it is widely accepted and favoured by general users and used for commercial activities and even at school or for daily life. This further promotes commercial activities such as a mobile office or an electrified life style that requires high flexibility and fast reaction.

However, because a handheld electronic device has the characteristics of being small in size and light in weight, this indirectly limits the storage size. If a user wishes to make the storage contents of the device meet its size requirement, one way is to cooperate with another electronic device to flexibly adjust the storage contents. When the need comes for synchronizing data, the device can also be used cooperatively with another electronic device to update the contents stored in the handheld electronic device onto another electronic device. In the meantime, if storage formats or fields are not exactly the same because of different devices, it requires further processing of any necessary conversions.

A conventional way to synchronize data is by transmitting everything stored in the handheld electronic device to another electronic device to update its storage contents. Likewise, the same process is used to synchronize the handheld electronic device. This method has a drawback that if the data are too big, the synchronization process will be prolonged. Often, modified data are only a small portion of the stored data and yet the whole contents stored need to be transmitted.

Another problem arises when the data formats or fields are not exactly the same. The conventional way is to transmit the whole contents to the other end, and then let the device of the other end to convert the data format or to collect the corresponding section. There are two drawbacks for this process. One is that there might be only a small portion of the transmitted contents is required by the device of the receiver end. Transmitting the whole contents is therefore a waste of the bandwidth and time. The other drawback is that if the hardware for executing conversion or retrieving is less powerful, the above-mentioned process will consume considerable amount of system resources and cause inconveniences to the user.

Therefore, in view of the above problems, the current challenges that need to be resolved are to minimise unnecessary data transmission in order to economise the use of bandwidth and time, and to prevent the waste of system resources of the receiving end device so that system resources can be used for other purposes in order to improve the efficiency of the device.

SUMMARY OF THE INVENTION

In view of the forementioned problems, it is an object of the invention to provide a data synchronization system which updates contents stored in the devices according to modification records, and transmits only the common format section of the modified data in order to achieve the objects of synchronizing data between devices and minimising unnecessary data transmission.

In order to achieve the above objects, the data synchronization system of the invention is implemented in a handheld electronic device and a desktop computer. The handheld electronic device includes a first data block. The desktop computer includes a second data block. Furthermore, data formats of the first data and second data that are stored in the first and second data blocks respectively contain a common format section.

The data synchronization system includes a first memory device in the handheld electronic device for storing a first modification record of the first data block, a second memory device in the desktop computer for storing a second modification record of the second data block, and a synchronization program installed in the desktop computer that updates the first and the second data block according to the first and second modification records, and transmits only the contents of the common format section when transmitting the first or second data between the handheld electronic device and the desktop computer.

The invention also provides a data synchronization method, which is implemented in a handheld electronic device and a desktop computer. The handheld electronic device includes a first data block. The desktop computer includes a second data block. Besides, data formats of the first and second data that are stored in the first and second data blocks respectively contain a common format section.

The data synchronization method includes a first step for reading a first modification record, wherein the first modification record is stored in the handheld electronic device for recording modifications of the first data block. The next step is to read a second modification record stored in the desktop computer for recording modifications of the second data block. The last step is to update the first and second data blocks according to the first and second modification records. Furthermore, when the first or second data is to be transmitted between the handheld electronic device and the desktop computer, only the contents of the common format section are transmitted.

The data synchronization system and method of the invention is based on the modification records stored separately in the handheld electronic device and the desktop computer to update contents stored in each device. Besides, if there is a need for transmitting data, only the modified data will be transmitted. If data formats between the devices are different, prior identifying and retrieving only the contents of the common format section achieve the object of data synchronization between devices and reducing unnecessary data transmission.

BRIEF DESCRIPTION OF THE DRAWINGS

FIG. 3 is a structure diagram showing the structure of modification record in one embodiment of the invention.

FIG. 5a is a schematic diagram showing the contents of the address book before data synchronization.

DETAILED DESCRIPTION OF THE PREFERRED EMBODIMENTS

Figure 1:
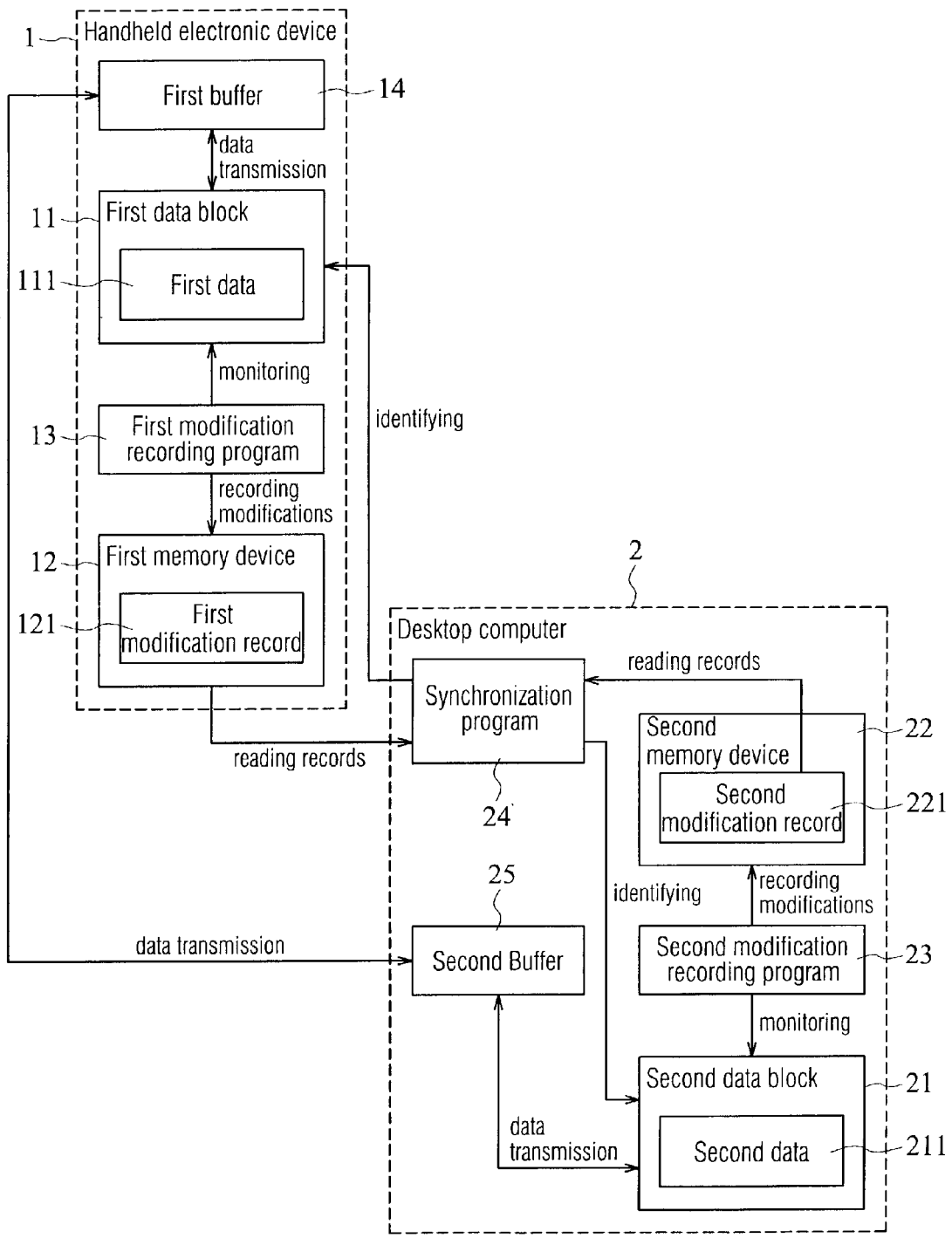
FIG. 1 is a structure diagram illustrating the structure of data synchronization system in accordance with an embodiment of the invention.

The data synchronization system and method of the invention will be described in detail with the following description of the preferred embodiments and the accompanying drawings, in which like reference characters designate the same or similar elements.

As shown in FIG. 1, the data synchronization system according to a preferred embodiment of the invention is implemented in a handheld electronic device 1 and a desktop computer 2. The handheld electronic device 1 includes a first data block 11, and the desktop computer 2 includes a second data block 21. The data synchronization system includes a first memory device 12 in the handheld electronic device 1 for storing a first modification record 121 of the first data block 11, a second memory device 22 in the desktop computer 2 for storing a second modification record 221 of the second data block 21, and a synchronization program 24 installed in the desktop computer 2. The synchronization program 24 updates the first data block 11 and the second data block 21 according to the first modification record 121 and the second modification record 221. When transmitting modified records of the first data block 11 or the second data block 21 between the handheld electronic device and the desktop computer, only the contents of the common format section it transmitted.

Figure 2:
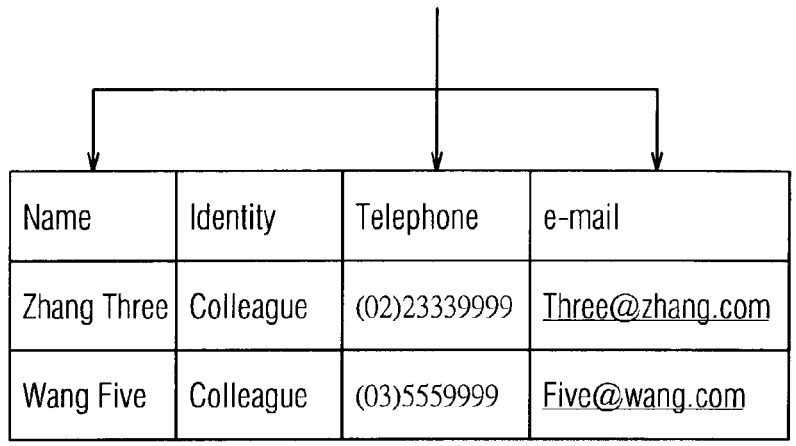
FIG. 2 is a schematic diagram illustrating the contents of the address book and its common format section.
Figure 2:
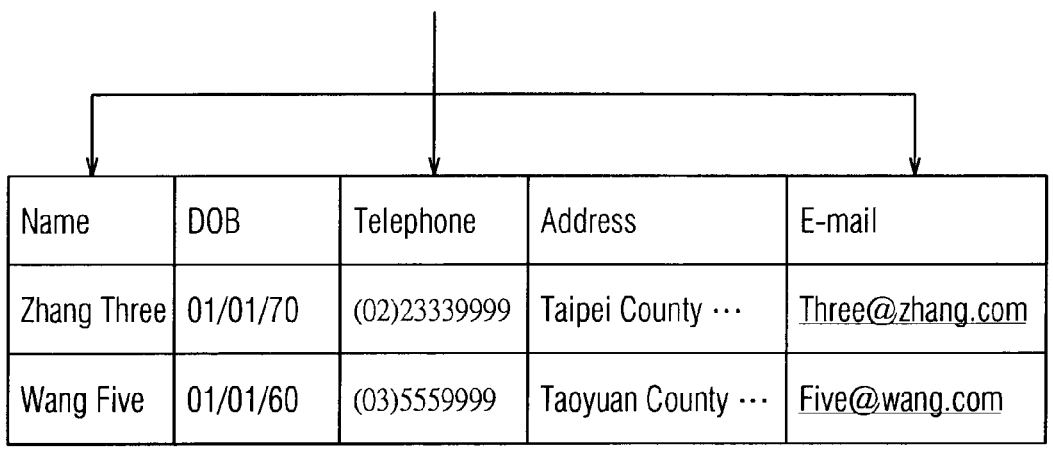

The common format section includes the corresponding sections in two data formats that have the same or the same type of data. For example, FIG. 2 shows address books 1 and 2. The address book 1 contains four fields: Name, Identity, Telephone and e-mail. The address book 2 contains five fields: Name, DOB, Telephone, Address and e-mail. Thus, the common format section of the address book 1 and 2 are the three fields: Name, Telephone and e-mail. The contents of the common format section are the actual data stored in these three fields. It should be noted that this method may also be applied to retrieve common format section of files that did not store data in the form of fields. It uses the same definition to determine whether data belong to the common format section and may pre-set the determined result in the synchronization program 24 for the use of identifying.

Furthermore, as shown in FIG. 1, the handheld electronic device 1 further includes a first modification recording program 13 which monitors modifications in the first data block 11 and records the modifications in the first modification record 121. The above-mentioned modifications include adding, deleting and amending. Similarly, the desktop computer 2 also includes a second modification recording program 23 which operates in a way that is analogy to the first modification recording program 13.

Take the address books 1 and 2 in FIG. 2 as an example. The address book 1 is stored in the first data block 111, and the address book 2 is stored in the second data block 211. If the record for Zhang Three in the address book 1 is deleted, the first modification recording program 13 will detect this data modification and record the modifications in the first modification record 121. Similarly, if a record is added to the address book 2 with the following data: Name: Li Four, DOB: Jan. 1, 1966, Telephone: (02) 2222 4444, Address: Taipei County . . . , e-mail: Four@li.com, and the telephone number of Wong Five is modified to be (03) 555 7777, the second modification recording program 23 will detect and record these modifications in the second modification record 221. The address books 1 and 2 are as shown in FIG. 5a after the modification.

As shown in FIG. 3, the above-mentioned data modifications are recorded separately in the first modification record 121 and the second modification record 221. Besides, each modification record includes two fields: Object and Modification, which indicate the data to be modified, and the modification is to add, amend, or delete, as well as the affiliated parameters. It should be noted that the formats of the modification data is not limited to those listed in the FIG. 3, as long as it can clearly indicate the data to be modified, as well as the way of the modification.

When starting to synchronize data, the synchronization program 24 firstly reads the first modification record 121 from the handheld electronic device 1. According to the first modification record 121, it then updates the second data block 21 of the desktop computer 2. If there is a need to amend data or add new data, the synchronization program 24 further identifies the modified data that are to be transmitted, such as the first data 111 of the first data block 11. It then temporarily stores the contents of the common format section of the first data 111 in a first buffer 14 of the handheld electronic device 1. The data is then transmitted to the desktop computer 2.

Similarly, after completion of synchronizing the desktop computer 2, the synchronization program 24 also updates the first data block 11 of the handheld electronic device 1 according to the second modification record 221. If there is a need to amend data or to add new data, the synchronization program 24 further identifies the modified data that are to be transmitted, such as the second data 211 of the second data block 21. It then temporarily stores the contents of the common format section of the second data 211 in a second buffer 25 of the desktop computer 2. The data is then transmitted to the handheld electronic device 1.

It should be noted that the first data block 11, the first memory device 12, the first modification recording program 13 and the first buffer 14 may be placed all in the same memory device. For example, the first memory device 12 can be a flash memory, the first data block 11 and the first buffer 14 can be a block in the flash memory, and the first modification recording program 13 is an application program stored in the flash memory. By the same way, the second data block 21, the second memory device 22, the second modification recording program 23, as well as the synchronization program 24 and the second buffer 25 can all be stored in the same memory device. Moreover, the above-mentioned elements may also be distributed, in any arrangement and any combination, in a plurality of memory devices without affecting the implementation of the invention.

For better understanding of the invention, the following example is used to describe the steps of the data synchronization method in accordance with an embodiment of the invention.

Figure 4:
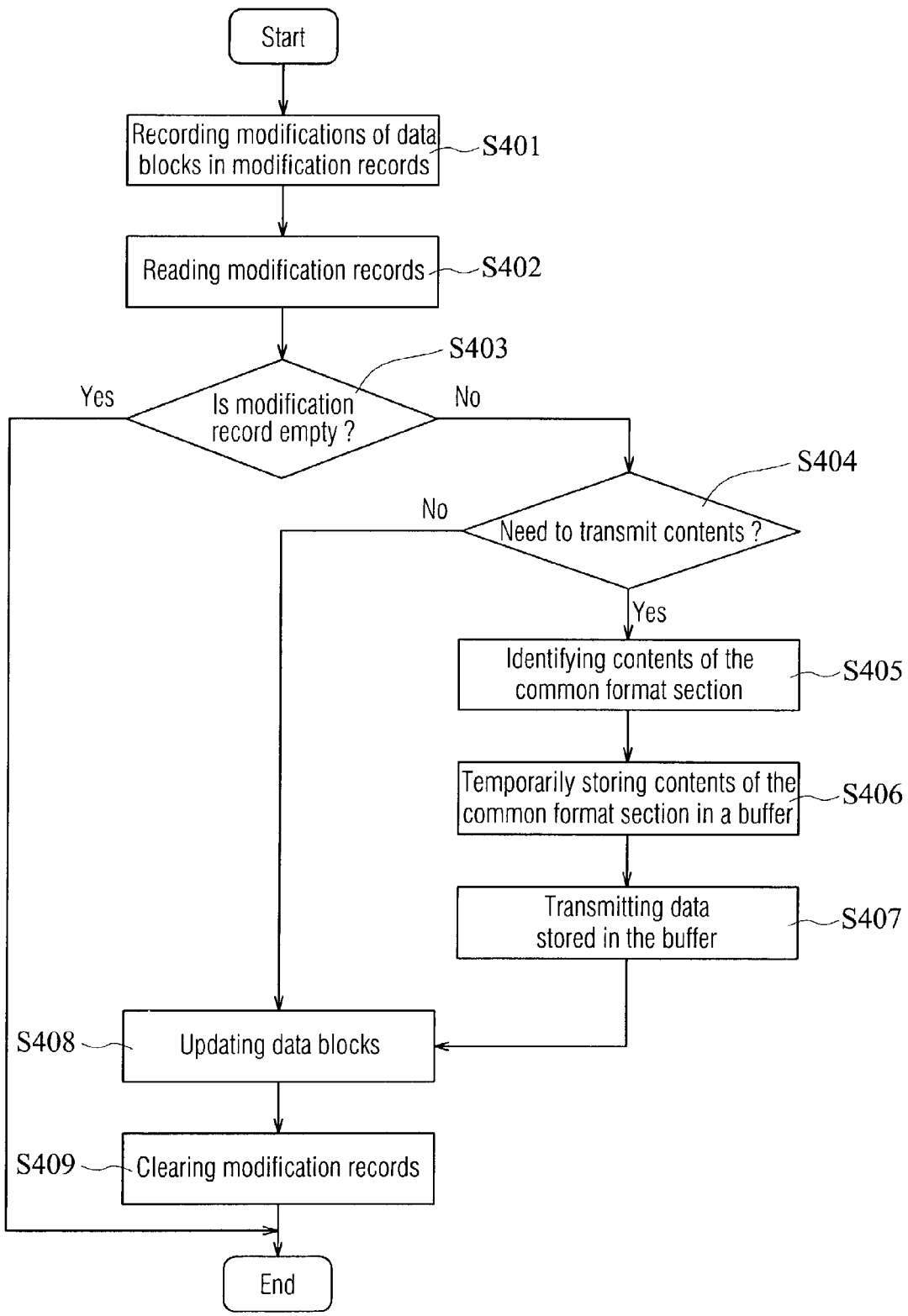
FIG. 4 is a flow chart illustrating the process of the data synchronization method.

With reference to FIG. 4, the data synchronization method includes the following steps. The first modification recording program 13 and the second modification recording program 23 first record modifications in the first data block 11 and second data block 21 into the first modification record 121 and the second modification record 221, respectively (S401). Next, when starting to synchronize data, the synchronization program 24 reads separately from the first modification record 121 and the second modification record 221 (S402) and determines whether the modification records are empty records (S403). If the modification records are empty, it indicates that no modifications have been made for the first data block 11 and the second data block 12. At this time, the action for data synchronization is not proceeded. Therefore, at step S403, if the modification record is determined to be empty, the whole process is terminated immediately.

If the modification record is not empty, then proceed to step S404 and determine if there is any data to be transmitted. If the data modification is to add or amend, the synchronization program 24 will then identify the contents of the common format section of the first data 111 and the second data 211 separately (S405). The synchronization program 24 then temporarily stores the data in the first buffer 14 or the second buffer 25 respectively (S406), and then transmits the data to its corresponding device (S407).

If the data modification is to delete, the synchronization program 24 simply transmits the data of the deleted object. Then, the synchronization program 24 updates the corresponding data blocks respectively (S408) and clears both modification records (S409) in order to prevent repetitive updating.

Figure 5B:
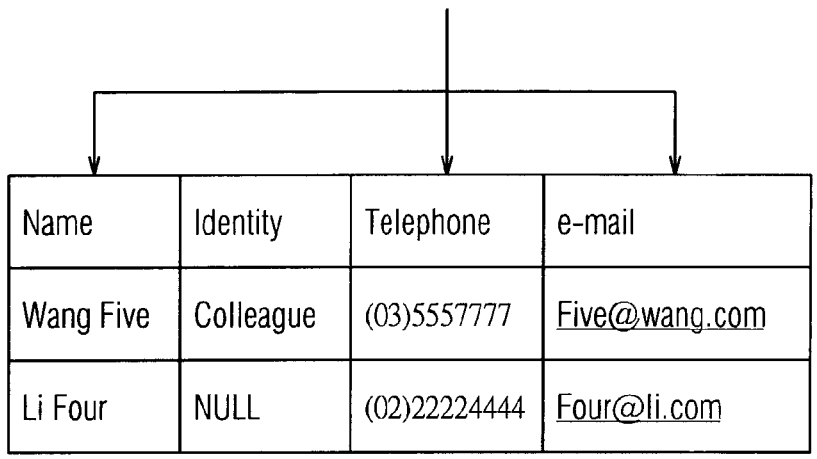
FIG. 5b is a schematic diagram showing the contents of the address book after data synchronization.
Figure 5B:
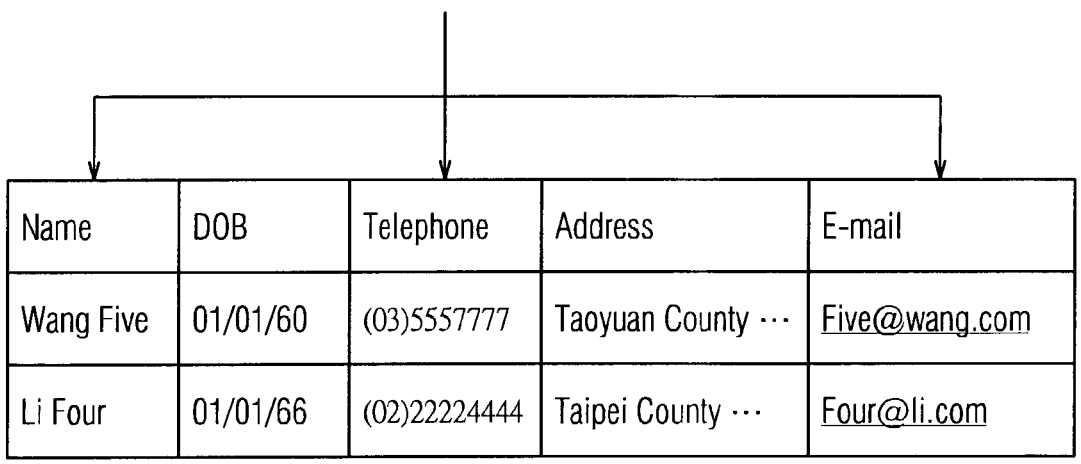

Take the address book 1 and address book 2 of FIG. 2, and the first modification record 121 and the second modification record 221 of FIG. 3 as examples. The contents of address book 1 and address book 2 before data synchronization is as shown in FIG. 5a. When starting to synchronize data, the synchronization program 24 reads the first modification record 121 as shown in FIG. 3 and instructs to delete the record of "Zhang Three" in the address book 2. When completed, it then reads the second modification record 221, in which, the first record is to "Add [Li Four, Jan. 1, 1966, (02) 2222 4444, Taipei County . . . , Four@li.com]". The contents of the common format section is "Li Four, (02) 2222 4444, Four@li.com", which is temporarily stored in the buffer 25 and then transmitted to the handheld electronic device 1 to add a new record of "Li Four" in the address book 1. Similarly, the second record is to "Amend [NULL, NULL, (03) 555 7777, NULL, NULL]". The contents of the common format section is "NULL, (03) 555 7777, NULL", which is temporarily stored in the buffer 25 and then transmitted to the handheld electronic device 1 to modify the telephone number of Wang Five to "(03) 555 7777". The contents of the address books after data synchronization is as shown in FIG. 5b.

It should be noted that the order for updating the handheld electronic device 1 and the desktop computer 2, and any conflicts between the modifications such as the problem of amending a record in one device but deleting the same record in the other device, can be determined by the user according to his or her needs. This does not affecting the implementation of the invention and therefore will not be discussed in any further details.

To sum up, the data synchronization system and method in the invention updates the contents stored in each device based on the modification records stored separately in a handheld electronic device and a desktop computer. If it is required to transmit data, only modified data are transmitted. If data formats between the devices are different, prior identifying and retrieving only the contents of the common format section achieve the object of data synchronization between devices in order to reduce unnecessary data transmission.

While the invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the invention.

What is claimed is:

1. A data synchronization system which is implemented in a handheld electronic device and a desktop computer, wherein the handheld electronic device includes a first data block, the desktop computer includes a second data block, and a first data format of a first data stored in the first data block and a second data format of a second data stored in the second data block include a common format section respectively, the data synchronization system comprises:
   a first memory device in the handheld electronic device to store a first modification record of the first data block;
   a second memory device in the desktop computer to store a second modification record of the second data block; and
   a synchronization program installed in the desktop computer, which updates the first and second data blocks according to the first and the second modification records, and transmits only the contents of the common format section while transmitting one of the first data and the second data between the handheld electronic device and the desktop computer.

2. The data synchronization system of claim 1, wherein the first data and the second data contain at least one corresponding field respectively, the at least one corresponding field has same or same kind of data, and the common format section are constructed by the at least one corresponding field.

3. The data synchronization system of claim 1, wherein the handheld electronic device further comprises:
   a first modification recording program for monitoring modifications of the first data block and recording the modifications in the first modification record.

4. The data synchronization system of claim 1, wherein the desktop computer further comprises:
   a second modification recording program for monitoring modifications of the second data block and recording the modifications in the second modification record.

5. The data synchronization system of claim 1, wherein the synchronization program further identifies the contents of the common format section of the first data and the second data.

6. The data synchronization system of claim 1, wherein the handheld electronic device further comprises:
   a first buffer for temporarily storing the contents of the common format section during the transmission of the common section of the first data.

7. The data synchronization system of claim 1, wherein the desktop computer further comprises:
   a second buffer for temporarily storing the contents of the common format section during the transmission of the common format section of the second data.

8. A handheld electronic device which is used in conjunction with a desktop computer, wherein the desktop computer includes a second data block, a second memory device for storing a second modification record of the second data block, and a synchronization program, the handheld electronic device comprises:

a first data block, wherein a first data format of a first data stored in the first data block and a second data format of a second data stored in the second data block include a common format section respectively; and a first memory device for storing a first modification record of the first data block, and the synchronization program updates the first and second data blocks according to the first and second modification records, and transmits only the contents of the common format section while transmitting one of the first and second data between the handheld electronic device and the desktop computer.

9. The handheld electronic device of claim 8, wherein the first data and the second data contain at least one corresponding field respectively, and the at least one corresponding field has same or same kind of data, and the common format section are constructed by the at least one corresponding field.

10. The handheld electronic device of claim 8, further comprising:

a first modification recording program for monitoring modifications of the first data block and recording the modifications in the first modification record.

11. The handheld electronic device of claim 8, wherein the desktop computer further comprises:

a second modification recording program for monitoring modifications of the second data block and recording the modifications in the second modification record.

12. The handheld electronic device of claim 8, wherein the synchronization program further identifies the contents of the common format section of the first and second data.

13. The handheld electronic device of claim 8, further comprising:

a first buffer for temporarily storing the contents of the common format section during the transmission of the common format section of the first data.

14. The handheld electronic device of claim 8, wherein the desktop computer further comprises:

a second buffer for temporarily storing the contents of the common format section during the transmission of the common format section of the second data.

15. A desktop computer which is used in conjunction with a handheld electronic device, wherein the handheld electronic device includes a first data block and a first memory device for storing a first modification record of the first data block, the desktop computer comprises:

a second data block, wherein a second data format of a second data stored in the second data block and a first data format of a first data stored in the first data block include a common format section;

a second memory device for storing a second modification record of the second data block; and a synchronization program, which updates the first and second data block according to the first and second modification records, and transmits only the contents of the common format section while transmitting one of the first and second data between the handheld electronic device and desktop computer.

16. The desktop computer of claim 15, wherein the first data and the second data contain at least one corresponding field respectively, the at least one corresponding field has same or same kind of data, and the common format section are constructed by the at least one corresponding field.

17. The desktop computer of claim 15, further comprising:

a second modification recording program for monitoring modifications in the second data block and storing the modifications in the second modification record.

18. The desktop computer of claim 15, wherein the handheld electronic device further comprises:

a first modification recording program for monitoring modifications in the first data block and storing the modifications in the first modification record.

19. The desktop computer of claim 15, wherein the synchronization program further identifies the contents of the common format section of the first and second data.

20. The desktop computer of claim 15, wherein the handheld electronic device further comprises:

a first buffer for temporarily storing the contents of the common format section during the transmission of the common format section of the first data.

21. The desktop computer of claim 15, further comprising:

a second buffer for temporarily storing the contents of the common format section during the transmission of the common format section of the second data.

22. A data synchronization method, which is implemented in a handheld electronic device and a desktop computer, wherein the handheld electronic device includes a first data block, the desktop computer includes a second data block, and a first data format of a first data stored in the first data block and a second data format of a second data stored in the second data block include a common format section respectively, the method comprises the steps of:

reading a first modification record stored in the handheld electronic device and recording modifications of the first data block;

reading a second modification record stored in the desktop computer and recording modifications of the second data block; and updating the first and second data blocks according to the first and second modification records, and transmitting only the contents of the common format section when transmitting one of the first data and the second data between the handheld electronic device and the desktop computer.

23. The data synchronization method of claim 22, wherein the first data and the second data contain at least one corresponding field respectively, the at least one corresponding field has same or same kind of data, and the common format section are constructed by the at least one corresponding field.

24. The data synchronization method of claim 22, further comprising the step of:

identifying the contents of the common format section of the first and second data.

25. The data synchronization method of claim 22, further comprising the step of:

storing temporarily the contents of the common format section of the first data onto a first buffer of the handheld electronic device.

26. The data synchronization method of claim 22, further comprising the step of:

storing temporarily the contents of the common format section of the second data onto a second buffer of the desktop computer.

27. The data synchronization method of claim 22, further comprising the steps of:

recording modifications of the first data block in the first modification record; and recording modifications of the second data block in the second modification record.

* * * * *